March 2, 1937.  T. T. VARNEY, JR  2,072,391
COMBINED LIFTING AND COUPLING TOOL
Filed June 29, 1936
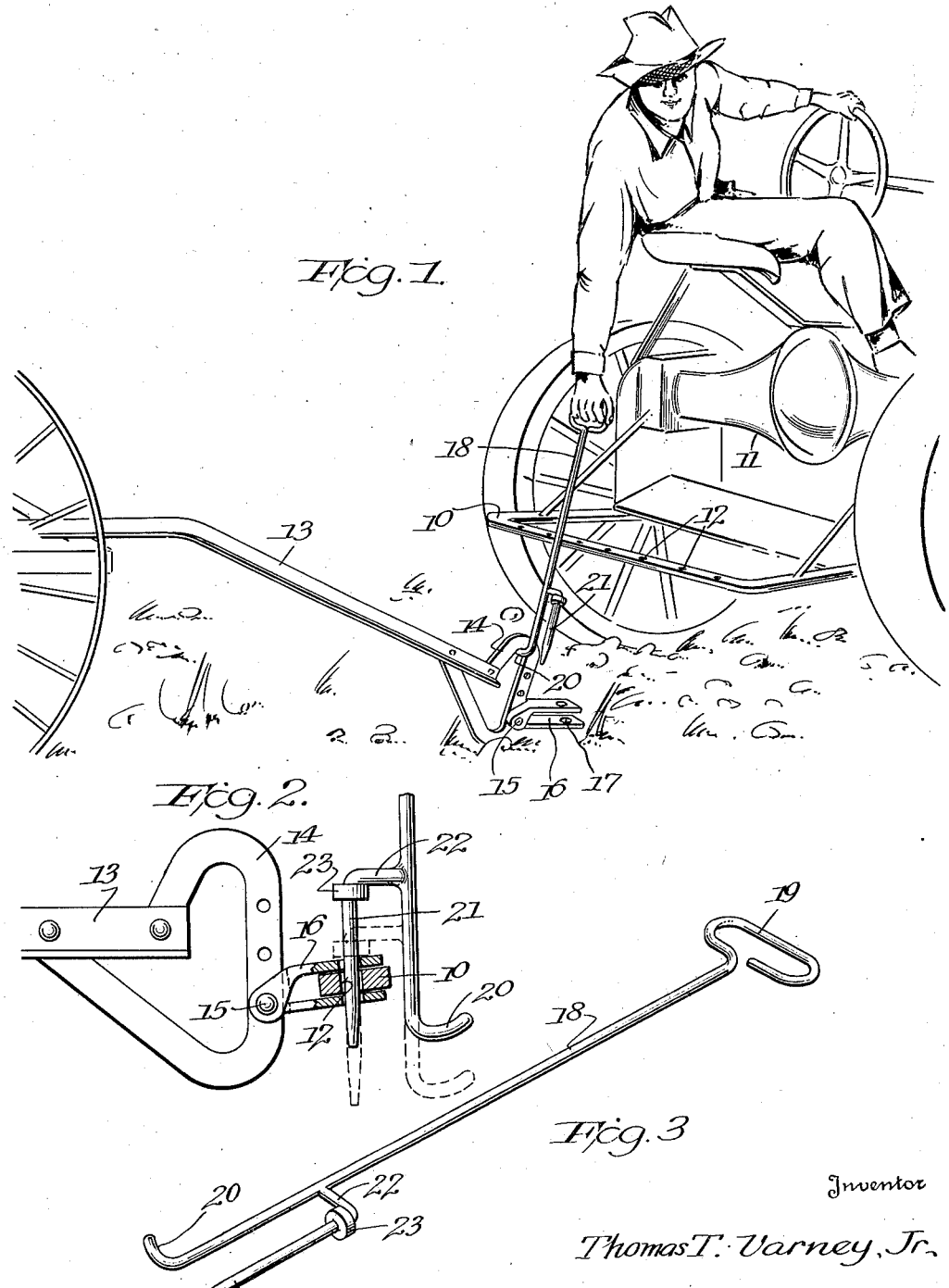
Inventor
Thomas T. Varney, Jr.
By Cushman Darby & Cushman
Attorneys Patented Mar. 2, 1937

2,072,391

UNITED STATES PATENT OFFICE 2,072,391

COMBINED LIFTING AND COUPLING TOOL

Thomas T. Varney, Jr., Broken Bow, Nebr.

Application June 29, 1936, Serial No. 88,059

1 Claim. (Cl. 280—33.15)

This invention relates to coupling tools and refers particularly to a combined lifting and coupling tool.

An object of the invention is the provision of a tool designed to facilitate the coupling and uncoupling of vehicles and particularly farm machinery and implements to tractors. In the usual coupling operations it is necessary for the operator to leave the power vehicle or tractor, lift the draft bar of the implement into coupling position and then insert the coupling or hitch pin. The use of the present invention eliminates these laborious coupling operations and permits the driver or operator to perform these operations without leaving the tractor.

This and other objects of the invention will become apparent from the following description when taken in conjunction with the accompanying claim and drawing:

Referring to the drawing:

Figure 1 is a perspective view of the draft rigging of a tractor and farm implement in uncoupled relation with the hook of the lifting and coupling tool in operative position;

Figure 2 is a side elevation partly in section of the draft rigging in coupled relation with the coupling pin in operative position, and Figure 3 is a perspective view of the lifting and coupling tool.

In the drawing I have illustrated only one of many types of draft rigging that may be lifted and coupled with my tool. In these views, the numeral 10 designates a flat substantially U-shaped bar projecting rearwardly from a power vehicle or tractor 11 and extending from side to side thereof in a horizontal plane. This bar is provided with a plurality of spaced holes or openings 12 for the reception of the coupling means. The machine or implement to be coupled to the tractor is provided with a draft bar 13 having a closed loop 14 to which is adjustably and pivotally connected a coupling element 15. This element comprises spaced arms 16 adapted when coupled, to straddle the cross bar 10. Each arm of the coupling element is provided adjacent its free end with an opening 17 aligned with the opening in the other arm and adapted to register with one of the openings 12 in the cross bar. When in this position, a coupling pin is slipped through the openings to couple the farm machine to the tractor.

Heretofore, with the usual type of coupling or hitch pin utilized to couple the vehicles, it has been necessary for the operator to leave the tractor, lift the draft rigging of the farm implement to a height to permit insertion of the cross bar between the arms of the coupling element, then pull this element forwardly until the holes 17 register with the opening 12 in the cross bar and finally insert the hitch pin. Such an operation is laborious, time consuming and also dangerous unless the operator is particularly careful in guarding his hands and arms from injury.

With the present invention, these undesirable features are obviated and the coupling operation may be easily and quickly accomplished with my lifting and coupling tool without the operator leaving his seat on the tractor.

This tool comprises a shank 18 having a handle 19 at one end adapted to be grasped by the operator, the shank being of a length to permit easy access to the handle by the operator when the tool is in coupled or uncoupled position. The other or lower end of the shank is divided to form a lifting hook 20 and a coupling or hitch pin 21. Preferably, the hook 20 is a direct extension of the shank and is turned outwardly away from the coupling pin, as clearly shown in the drawing. The coupling pin 21 is connected to an offset portion 22 which is at right angles to the shank and to the pin whereby the latter extends substantially parallel to the shank and the hook.

With the tool as thus described and assuming that it is desired to couple a farm implement to the tractor, it is merely necessary for the operator to maneuver the tractor to a position directly in front of the draft bar or rigging 13 of the farm implement. The operator then grasps the tool by its handle 19 and leans rearwardly from his seat, as illustrated in Figure 1, to engage the hook 20 in the loop 14. He then lifts the draft bar to a position where a slight pull on the farm implement or a rearward movement of the tractor will move the cross bar 10 between the arms 16 of the coupling element 15 to a point where the holes 17 will register with one of the openings 12 in the cross bar. The hook is then disengaged from the loop 14 and the coupling pin 21 inserted through the several openings in the arms 16 and bar 10. This completes the coupling operation and the operator may then perform the necessary farming operations. When it is desired to uncouple the implement from the tractor, it is merely necessary for the operator to grasp the handle 19, pull the tool upwardly and then move the tractor forward a slight distance. When not in use as a coupling element the tool may be supported in one of the openings in the cross bar 10. In this position it will not interfere with the operation of the tractor but will permit the handle to be easily and quickly grasped by the operator when it is desired to couple another farm implement to the tractor.

By forming the tool so that the hook is turned outwardly from the coupling pin, the latter may be moved to coupling position without interference from the hook. Likewise, during its lifting operation the pin will not obstruct or interfere with the positioning of the hook in the loop 14.

It will be observed that at the point where the coupling pin 21 merges with the portion 22 there is provided an enlarged head 23. This constitutes a stop for limiting the downward movement of the pin during the coupling operation and functions to maintain the shank and handle in an upright position; otherwise the shank might work over to a position where it would be at a slant or an angle to the vertical and the coupling pin become dislodged, particularly if the ground over which the tractor is operating is unduly rough or uneven. It will be further observed that the straight portion of the hook 20 may constitute a coupling pin guide during insertion of the pin in the holes 12 and 17 and thus facilitate the coupling operation. Furthermore, by forming the tool so that the distance between the hook and the pin is only slightly greater than the distance between the inner end of the cross bar and the center of the holes in the bar, there will be created a locking action in that the frictional engagement between the coupling pin, hook and cross bar will tend to prevent upward movement of the tool while the elements are coupled together. It is to be understood, however, that such construction is merely optional and not entirely necessary as the weight of the tool should ordinarily be sufficient to retain the coupling pin in operative engagement with the coupling elements of the tractor and farm equipment.

I claim:

In a hitch for use between a tractor and a trailing implement wherein the tractor is provided with a draw bar having an aperture for the reception of a coupling pin and the trailer is provided with a draft member having a portion provided with an aperture adapted to mate with said tractor draw bar and to accommodate a lift hook, a combination lift and coupling tool comprising a rod divided at one end to form a hook and a coupling pin, the shank of the hook being spaced from the pin and the hook portion thereof extending outwardly from said pin, whereby the draft bar of the implement may be lifted to mating position with the draw bar, said pin then being inserted through said mating portions to complete the coupling.

THOMAS T. VARNEY, Jr.